(12) United States Patent
Oowaki

(10) Patent No.: US 12,415,276 B2
(45) Date of Patent: Sep. 16, 2025

(54) POSITIONING JIG

(71) Applicant: FANUC CORPORATION, Yamanashi (JP)

(72) Inventor: Morio Oowaki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 18/690,828

(22) PCT Filed: Oct. 13, 2021

(86) PCT No.: PCT/JP2021/037831
§ 371 (c)(1),
(2) Date: Mar. 11, 2024

(87) PCT Pub. No.: WO2023/062738
PCT Pub. Date: Apr. 20, 2023

(65) Prior Publication Data
US 2024/0399597 A1    Dec. 5, 2024

(51) Int. Cl.
*B25J 9/16* (2006.01)
*B25J 19/00* (2006.01)

(52) U.S. Cl.
CPC ............. *B25J 9/1692* (2013.01); *B25J 19/00* (2013.01)

(58) Field of Classification Search
CPC ................................. B25J 19/00; B25J 9/1692
See application file for complete search history.

(56) References Cited

U.S. PATENT DOCUMENTS

| 4,474,047 A | * | 10/1984 | Carlson | B25J 9/1692 33/1 PT |
| 4,481,592 A | * | 11/1984 | Jacobs | B25J 9/1692 318/632 |
| 4,505,049 A | * | 3/1985 | Kuno | B25J 13/088 33/655 |

(Continued)

FOREIGN PATENT DOCUMENTS

| JP | H03121792 A | 5/1991 |
| JP | H05337856 A | 12/1993 |

(Continued)

OTHER PUBLICATIONS

Nakashima (Year: 1985).*

*Primary Examiner* — Minnah L Seoh
*Assistant Examiner* — Gregory T Prather
(74) *Attorney, Agent, or Firm* — Maier & Maier, PLLC

(57) ABSTRACT

A positioning jig for a robot having two members constituting a joint, are supported to be movable relative to each other, and are provided with machined flat surfaces extending parallel to a relative movement direction, the surfaces having a linear marking placed therein, the marking extending in a direction orthogonal to the relative movement direction. The positioning jig includes: a base part with a flat pressing surface placeable in close contact with one of the machined flat surfaces, and a linear first edge extending along either the pressing surface or a plane parallel to the pressing surface; and a marking indicator part placed within a plane containing the first edge and orthogonal to the pressing surface, and is placed at a position that is aligned with at least a portion of the marking in the other of the machined flat surfaces.

6 Claims, 15 Drawing Sheets

(56) References Cited

U.S. PATENT DOCUMENTS

| | | | | |
|---|---|---|---|---|
| 4,702,665 A * | 10/1987 | Nakashima | ................ | B25J 9/10 |
| | | | | 414/730 |
| 5,570,609 A * | 11/1996 | Nihei | ........................ | B25J 9/10 |
| | | | | 901/50 |
| 5,639,204 A * | 6/1997 | Nihei | ..................... | B25J 9/1005 |
| | | | | 901/50 |
| 6,071,060 A * | 6/2000 | Campbell | ............... | B25J 9/1692 |
| | | | | 901/50 |
| 12,248,308 B2 * | 3/2025 | Takatsu | .............. | G05B 19/4189 |
| 2003/0177656 A1 * | 9/2003 | Sawdon | ............... | B25J 15/0052 |
| | | | | 33/645 |
| 2022/0203520 A1 * | 6/2022 | Motoyoshi | ............. | B25J 9/1692 |
| 2023/0173680 A1 * | 6/2023 | Yoshida | ................... | G01B 5/14 |
| | | | | 73/1.75 |
| 2023/0339097 A1 | 10/2023 | Yamaguchi et al. | | |

FOREIGN PATENT DOCUMENTS

| | | | |
|---|---|---|---|
| JP | 2000237913 A | | 9/2000 |
| JP | 2001336291 A | | 12/2001 |
| JP | 2011251365 A | | 12/2011 |
| JP | 2017100240 A | | 6/2017 |
| JP | 2020127988 A | | 8/2020 |
| WO | WO-8502575 A1 * | | 6/1985 |

* cited by examiner

POSITIONING JIG

TECHNICAL FIELD

The present disclosure relates to a positioning jig.

BACKGROUND

There is a known robot in which two members that are connected so as to be rotatable relative to each other and that constitute a joint are respectively provided with scribe line-like markings for performing mutual positioning (for example, see Japanese Unexamined Patent Application, Publication No. 2011-251365.

By aligning the scribe line-like markings provided on the two members of the joint in a state in which the joint is mastered, after replacement of a motor or a reduction gear for the joint, it is possible to easily restore the joint to the origin position by means of the markings.

SUMMARY

An aspect of the present disclosure is a positioning jig for a robot in which two members that constitute a joint and that are supported so as to be movable relative to each other are respectively provided with machined flat surfaces extending parallel to a relative movement direction, the machined flat surfaces each have a linear marking placed therein, and the marking extends in a direction orthogonal to the relative movement direction, the positioning jig including: a base part that includes a flat pressing surface placeable so as to be in close contact with one of the machined flat surfaces, and a linear first edge extending along either the pressing surface or a plane parallel to the pressing surface; and a marking indicator part that is placed within a plane containing the first edge and being orthogonal to the pressing surface, and that, when the first edge is brought into alignment along the marking in the one of the machined flat surfaces while two markings are placed in the same plane, is placed at a position that is aligned with at least a portion of the marking in the other of the machined flat surfaces.

DESCRIPTION OF EMBODIMENTS

A positioning jig 50 according to a first embodiment of the present disclosure will be described below with reference to the drawings.

Figure 1:
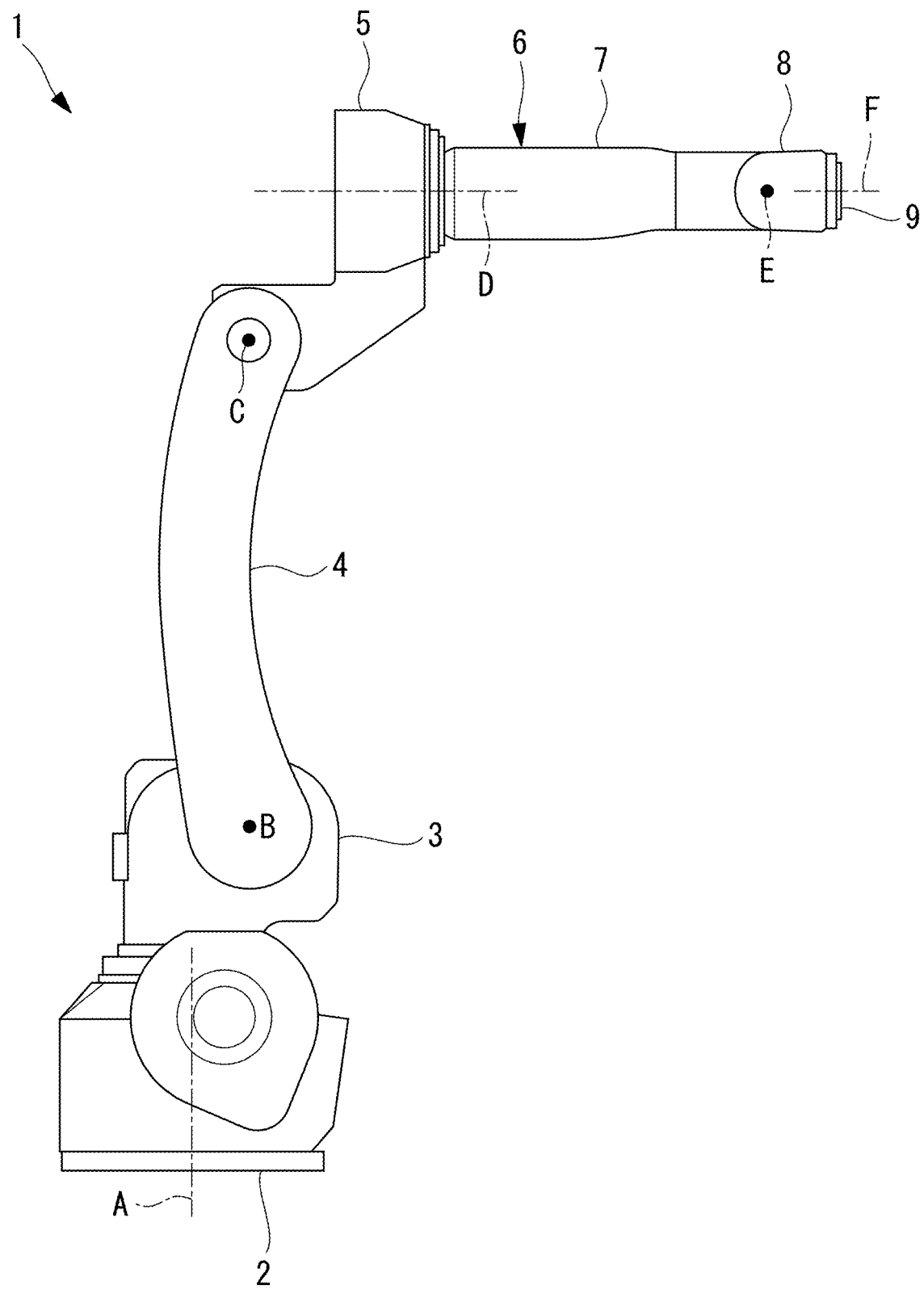
FIG. 1 FIG. 1 is a side view showing an example of a robot to which a positioning jig according to a first embodiment of the present disclosure is applied.
Figure 2:
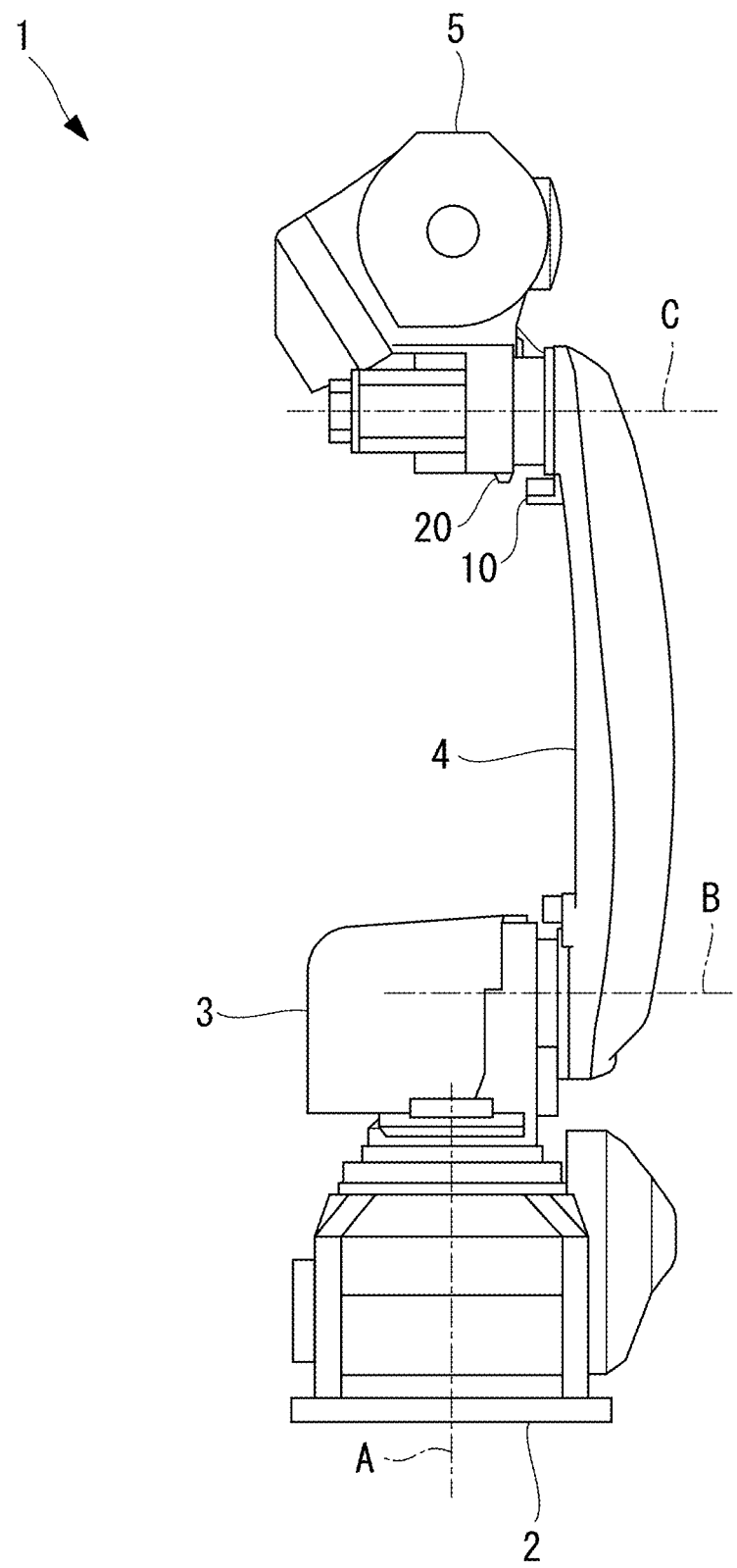
FIG. 2 FIG. 2 is a rear view of the robot in FIG. 1.

The positioning jig 50 according to this embodiment is used, for example, to easily restore the origin position of each joint of a robot 1 shown in FIGS. 1 and 2.

The robot 1 shown in FIGS. 1 and 2 is, for example, a vertical articulated robot including six rotary joints (joints). The robot 1 includes a base (member) 2 that is installed on a floor, a revolving drum (member) 3 that is supported so as to be rotatable about a vertical first axis A with respect to the base 2, and a first arm (member) 4 that is supported so as to be rotatable about a horizontal second axis B with respect to the revolving drum 3. In addition, the robot 1 includes a second arm (member) 5 that is supported so as to be rotatable with respect to the first arm 4 about a third axis C parallel to the second axis B, and a three-axis wrist unit 6 that is disposed at the distal end of the second arm 5.

The wrist unit 6 includes a first wrist element (member) 7 that is supported so as to be rotatable about a fourth axis D, which is disposed in a plane orthogonal to the third axis C, with respect to the second arm 5. In addition, the wrist unit 6 includes a second wrist element (member) 8 that is supported so as to be rotatable with respect to the first wrist element 7 about a fifth axis E orthogonal to the fourth axis D. Furthermore, the wrist unit 6 includes a third wrist element (member) 9 that is supported so as to be rotatable about a sixth axis F, which is orthogonal to the fifth axis E and intersects the third axis C, with respect to the second wrist element 8.

Each of the rotary joints includes two relatively rotatable members. For example, a first rotary joint includes the base 2 and the revolving drum 3 that are relatively rotatable. In addition, a second rotary joint includes the revolving drum 3 and the first arm 4 that are relatively rotatable. In addition, a third rotary joint includes the first arm 4 and the second arm 5 that are relatively rotatable.

A fourth rotary joint includes the second arm 5 and the first wrist element 7 that are relatively rotatable. A fifth rotary joint includes the first wrist element 7 and the second wrist element 8 that are relatively rotatable. In addition, a sixth rotary joint includes the second wrist element 8 and the third wrist element 9 that are relatively rotatable.

The two members 2, 3, 4, 5, 7, 8, 9 constituting each of the rotary joints are respectively provided with positioning bearing surfaces 10, 20 at positions adjacent to the boundary between the two members 2, 3, 4, 5, 7, 8, 9. As the positioning bearing surfaces 10, 20 in each of the rotary joints are similar, here, the positioning bearing surfaces 10, 20 that are respectively provided on the first arm 4 and the second arm 5 constituting the third rotary joint will be described as an example.

As shown in FIG. 2, the positioning bearing surface 10 of the first arm 4 is provided on a side surface adjacent to the boundary with the second arm 5 and orthogonal to the third axis C. In addition, the positioning bearing surface 20 of the second arm 5 is provided on a side surface adjacent to the boundary with the first arm 4.

Figure 3:
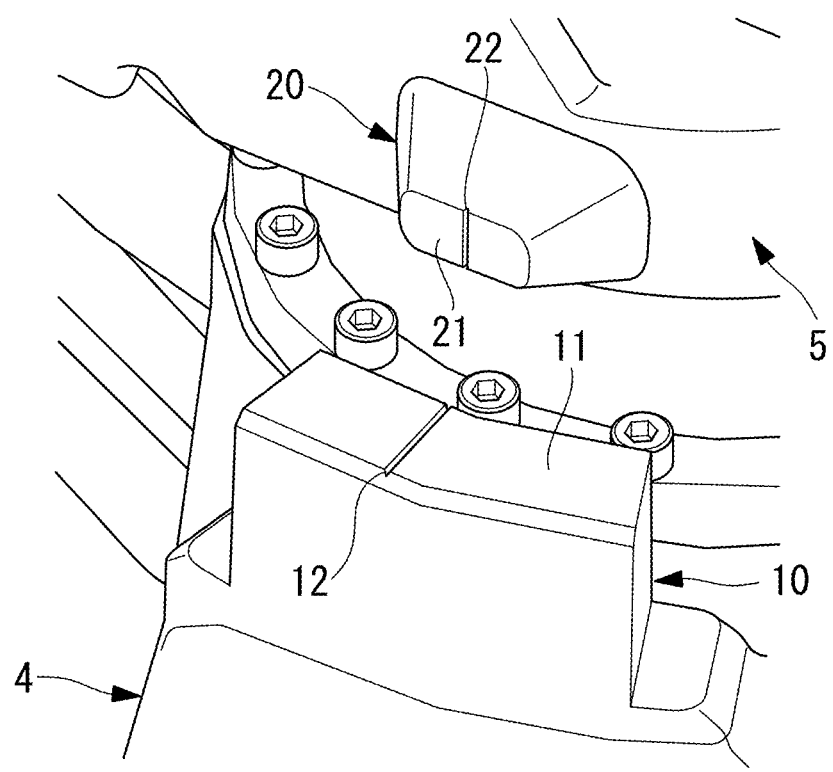
FIG. 3 FIG. 3 is a perspective view showing, in an enlarged manner, a third rotary joint constituted of a first arm and a second arm of the robot in FIG. 1.

As shown in FIG. 3, the positioning bearing surface 10 of the first arm 4 includes a bearing surface part (machined flat surface) 11 that is composed of a flat surface orthogonal to the third axis C, and a V-shaped groove 12 that is formed by notching a portion of the bearing surface part 11. The V-shaped groove 12 includes an inclined inner surface consisting of two flat surfaces intersecting so as to form a prescribed angle, for example, an angle of 90°, at a linear groove bottom (marking) 12a extending in a direction orthogonal to the third axis C. The groove bottom 12a of the V-shaped groove 12 extends in a direction orthogonal to the relative movement direction of the second arm 5 with respect to the first arm 4.

In addition, as shown in FIG. 3, the positioning bearing surface 20 of the second arm 5 includes a bearing surface part (machined flat surface) 21 that is composed of a flat surface extending in a tangential direction of a circle centered on the third axis C, and a V-shaped groove 22 that is formed by notching a portion of the bearing surface part 21. The V-shaped groove 22 includes an inclined inner surface consisting of two flat surfaces intersecting so as to form a prescribed angle, for example, an angle of 90°, at a linear groove bottom (marking) 22a extending parallel to the third axis C. The relative movement direction of the second arm 5 with respect to the first arm 4 is the tangential direction of the circle centered on the third axis C, and the groove bottom 22a of the V-shaped groove 22 extends in a direction orthogonal to the relative movement direction of the second arm 5.

The positioning bearing surface 10 of the first arm 4 is formed by machining the bearing surface part 11 and the V-shaped groove 12 during machining of a member constituting the first arm 4. In addition, the positioning bearing surface 20 of the second arm 5 is formed by machining the bearing surface part 21 and the V-shaped groove 22 during machining of a member constituting the second arm 5. The positioning bearing surfaces 10, 20 of the first arm 4 and the second arm 5 are formed at positions where the groove bottoms 12a, 22a of the V-shaped grooves 12, 22 are placed in the same plane when the second arm 5 is disposed, in terms of a design value, at the origin position, for example, the position in FIG. 1, with respect to the first arm 4.

Next, the positioning jig 50 according to this embodiment will be described below with reference to the drawings.

Figure 4:
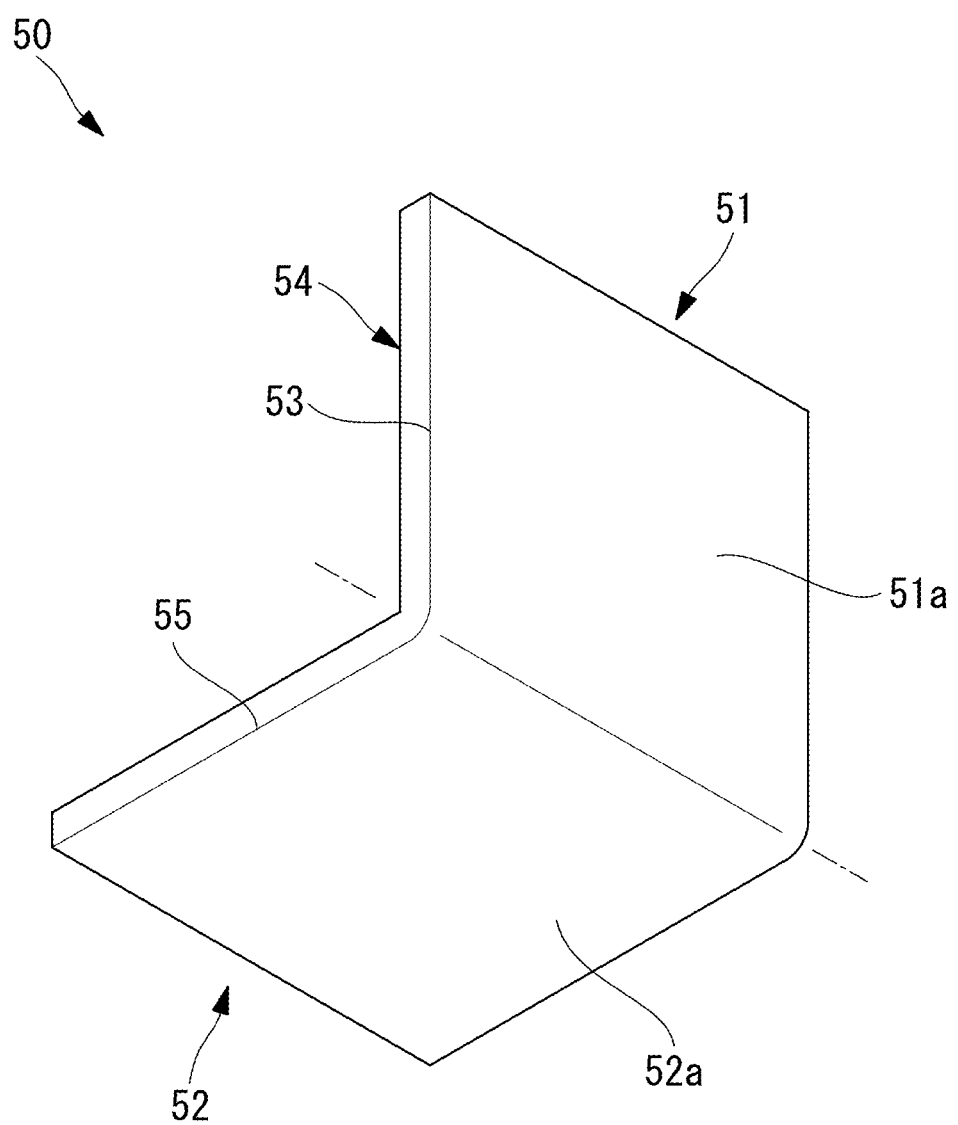
FIG. 4 FIG. 4 is a perspective view showing the positioning jig in FIG. 1.

As shown in FIG. 4, the positioning jig 50 according to this embodiment is a member formed in an L-shape by bending a rectangular strip-like flat plate member having a constant width by 90° at a central position in the length direction, along a folding line extending in the width direction.

Therefore, the positioning jig 50 includes two flat plate parts 51, 52 that are arranged at an angle of 90° with respect to each other, and the respective flat plate parts 51, 52 include flat pressing surfaces 51a, 52a disposed on the outside of the bend. In addition, at least one edge of the two flat plate parts 51, 52 in the width direction is placed on a plane orthogonal to the two pressing surfaces 51a, 52a.

With this configuration, one flat plate part 51 constitutes a base part 54 including the pressing surface 51a placeable so as to be in close contact with one bearing surface part 11, and a linear first edge 53 extending along a plane parallel to the pressing surface 51a. In addition, the other flat plate part 52 includes a second edge (marking indicator part) 55 that is placed in a plane including the first edge 53 of the base part 54 and orthogonal to the pressing surface 51a.

The length dimensions of the respective flat plate parts 51, 52 from the folding line are configured such that, when the pressing surface 51a of the base part 54 is pressed against the one bearing surface part 11, the pressing surface (supporting flat surface) 52a of the other flat plate part 52 can be pressed against the other bearing surface part 21. With this configuration, when the pressing surface 51a of the base part 54 is brought into close contact with the bearing surface part 11 of the positioning bearing surface 10 of the first arm 4 and the first edge 53 of the base part 54 is aligned with the groove bottom 12a of the V-shaped groove 12 provided in the bearing surface part 11, the linear second edge 55 is placed at a position along the bearing surface part 21 of the positioning bearing surface 20 of the second arm 5.

A positioning method using the thus-configured positioning jig 50 according to this embodiment will be described below.

Figure 5:
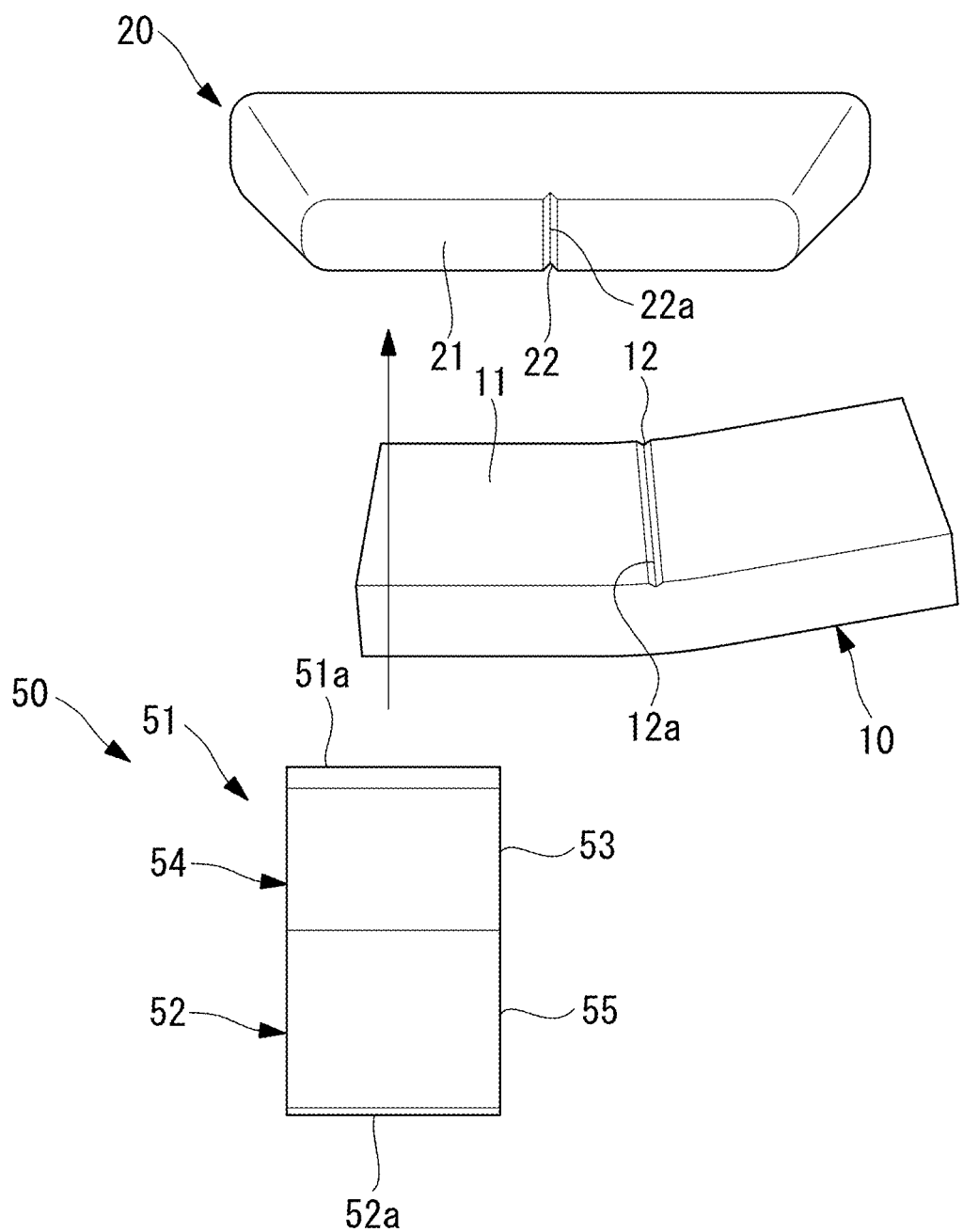
FIG. 5 FIG. 5 is a perspective view for explaining positioning procedure using the positioning jig in FIG. 4.
Figure 6:
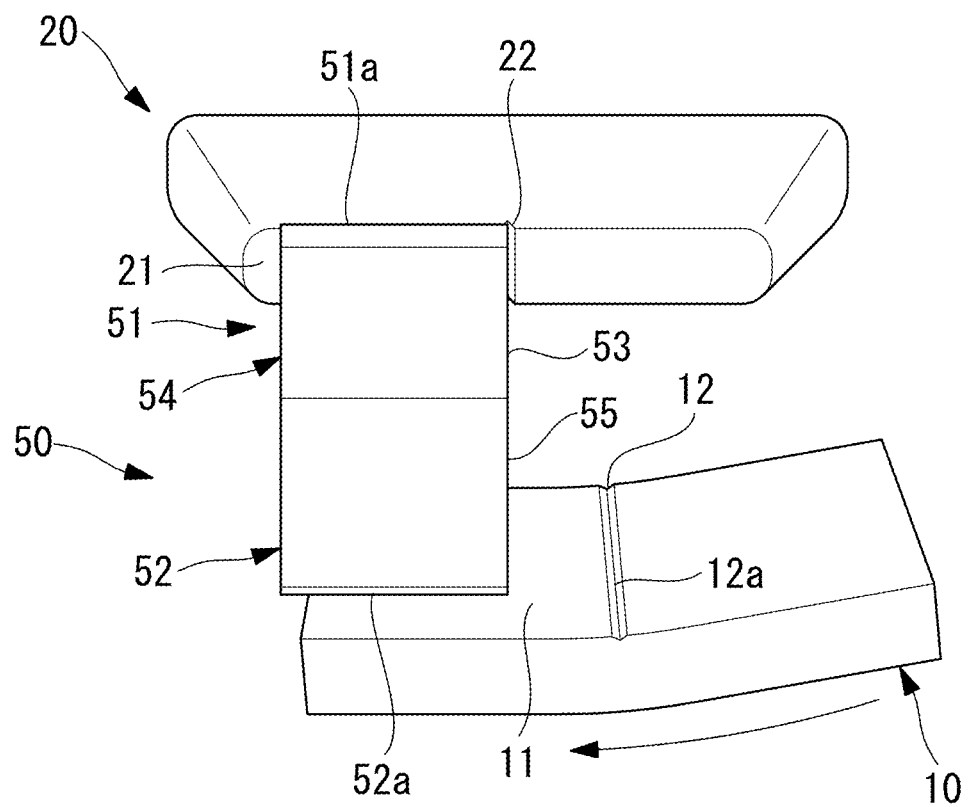
FIG. 6 FIG. 6 is a perspective view showing a state in which a first edge of the positioning jig in FIG. 4 is aligned with a V-shaped groove in a positioning bearing surface of the second arm.

For example, when performing positioning between the first arm 4 and the second arm 5, first, as shown in FIG. 5, a worker performs rough positioning between the positioning bearing surfaces 10, 20 provided on the first arm 4 and the second arm 5. Then, as shown in FIGS. 5 and 6, the pressing surface 51a of the base part 54 provided on one flat plate part 51 of the positioning jig 50 is brought into close contact with one of the positioning bearing surfaces 20, for example, the bearing surface part 21 of the positioning bearing surface 20 of the second arm 5. In addition, the pressing surface 52a of the other flat plate part 52 of the positioning jig 50 is brought into contact with the bearing surface part 11 of the positioning bearing surface 10 of the first arm 4.

Next, as shown in FIG. 6, the position of the base part 54 is adjusted so that the first edge 53 of the base part 54 is aligned with the groove bottom 22a of the V-shaped groove 22 provided in the bearing surface part 21 of the positioning bearing surface 20. Because the second edge 55 is placed in a plane including the first edge 53 of the base part 54 and orthogonal to the pressing surface 51a, at this time, the second edge 55 is disposed at a position indicating the position of the groove bottom 12a of the V-shaped groove 12 provided in the bearing surface part 11 of the first arm 4 in a state of being positioned with the second arm 5.

The positioning jig 50 according to this embodiment includes the pressing surfaces 51a, 52a to be pressed against the bearing surface parts 11, 21, and thus, the positioning jig 50 in a state in which the pressing surfaces 51a, 52a are pressed against the bearing surface parts 11, 21 can stably maintain the posture thereof.

In this state, the worker maintains, with one hand, the state in which the pressing surface 51a of the base part 54 of the positioning jig 50 is pressed against the bearing surface part 21 of the second arm 5, while operating a teach pendant with the other hand to slightly rotate the second arm 5 with respect to the first arm 4, as indicated by an arrow in FIG. 6.

Figure 7:
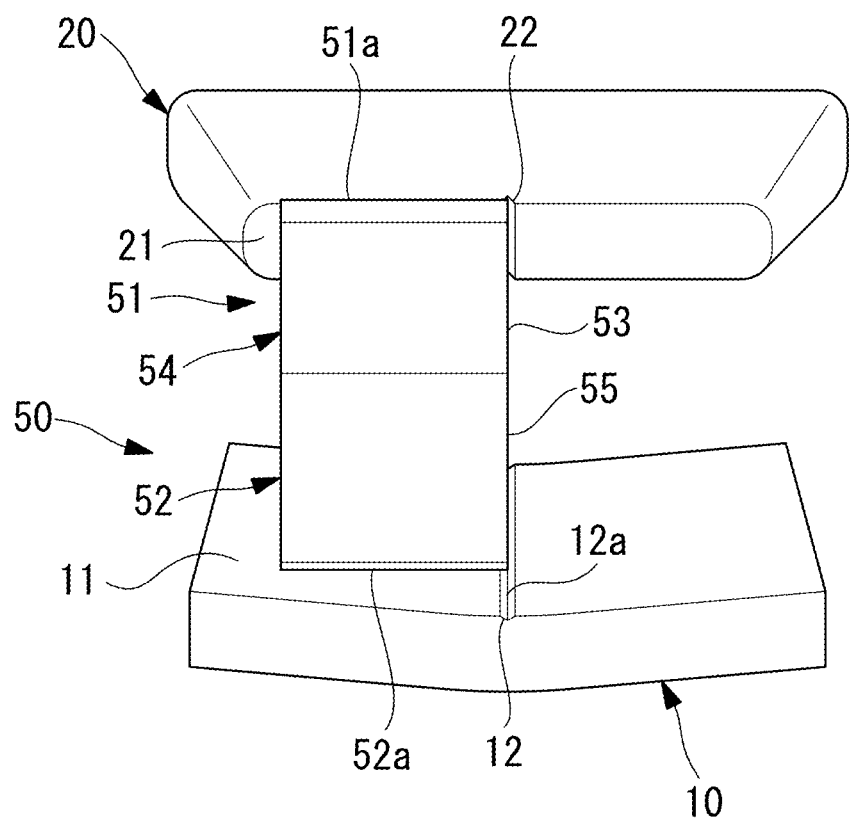
FIG. 7 FIG. 7 is a perspective view showing a state in which the second arm is rotated relative to the first arm from the state in FIG. 6, and a V-shaped groove in a positioning bearing surface of the first arm is aligned with a second edge.

Then, as shown in FIG. 7, when the groove bottom 12a of the V-shaped groove 12 provided in the bearing surface part 11 of the first arm 4 is aligned with the second edge 55 of the positioning jig 50, the first arm 4 and the second arm 5 can be easily positioned to the origin position.

As described above, the positioning jig 50 according to this embodiment has a length that allows the pressing surfaces 51a, 52a of the two flat plate parts 51, 52 to be arranged on the two bearing surface parts 11, 21. With this configuration, there is an advantage in that it is possible to accurately perform positioning between the first arm 4 and the second arm 5 by visual observation, even if the bearing surface parts 11, 21 are separated from each other.

In other words, even in a case in which the two members 2, 3, 4, 5, 7, 8, 9 to be positioned are separated by a reduction gear etc. disposed therebetween, it is not necessary to provide the bearing surface parts 11, 21 at positions excessively raised from the surfaces of the members 2, 3, 4, 5, 7, 8, 9 in order to adjoin the V-shaped grooves 12, 22 provided in the respective bearing surface parts 11, 21. Therefore, the individual members 2, 3, 4, 5, 7, 8, 9 of the robot 1 are not provided with unnecessary protrusions, and thus, it is possible to prevent hindrance in the operation of the robot 1.

In addition, because the base part 54 has the pressing surface 51a that can be pressed against one of the bearing surface parts 11, 21, a worker can easily maintain, with one hand, the state in which the pressing surface 51a is brought into close contact with the bearing surface part 11, 21 and the first edge 53 is aligned with the groove bottom 12a, 22a of the V-shaped groove 12, 22. Therefore, when performing positioning, it is not necessary to alternately hold the positioning jig 50 and the teach pendant, and thus, the positioning work can be easily and quickly performed.

Note that, although the L-shaped positioning jig having the two flat plate parts 51, 52 has been illustrated as an example in this embodiment, the positioning jig is not limited thereto.

So long as the positioning jig has the base part 54 having the pressing surface 51a and the first edge 53, and the second edge 55 that is placed at a position away from the pressing surface 51a in a direction opposite to the pressing surface 51a and also in a plane orthogonal to the pressing surface 51a and including the first edge 53, an arbitrary form may be employed.

Figure 8:
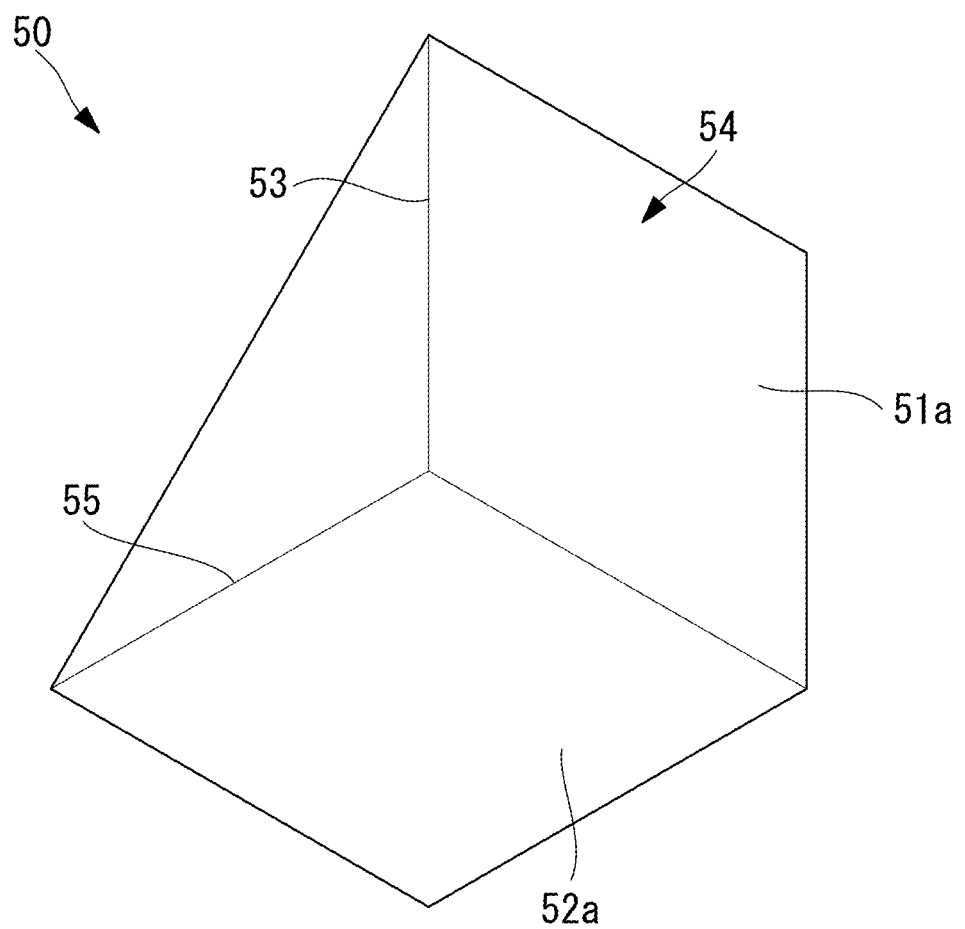
FIG. 8 FIG. 8 is a perspective view showing a modification of the positioning jig in FIG. 4.
Figure 9:
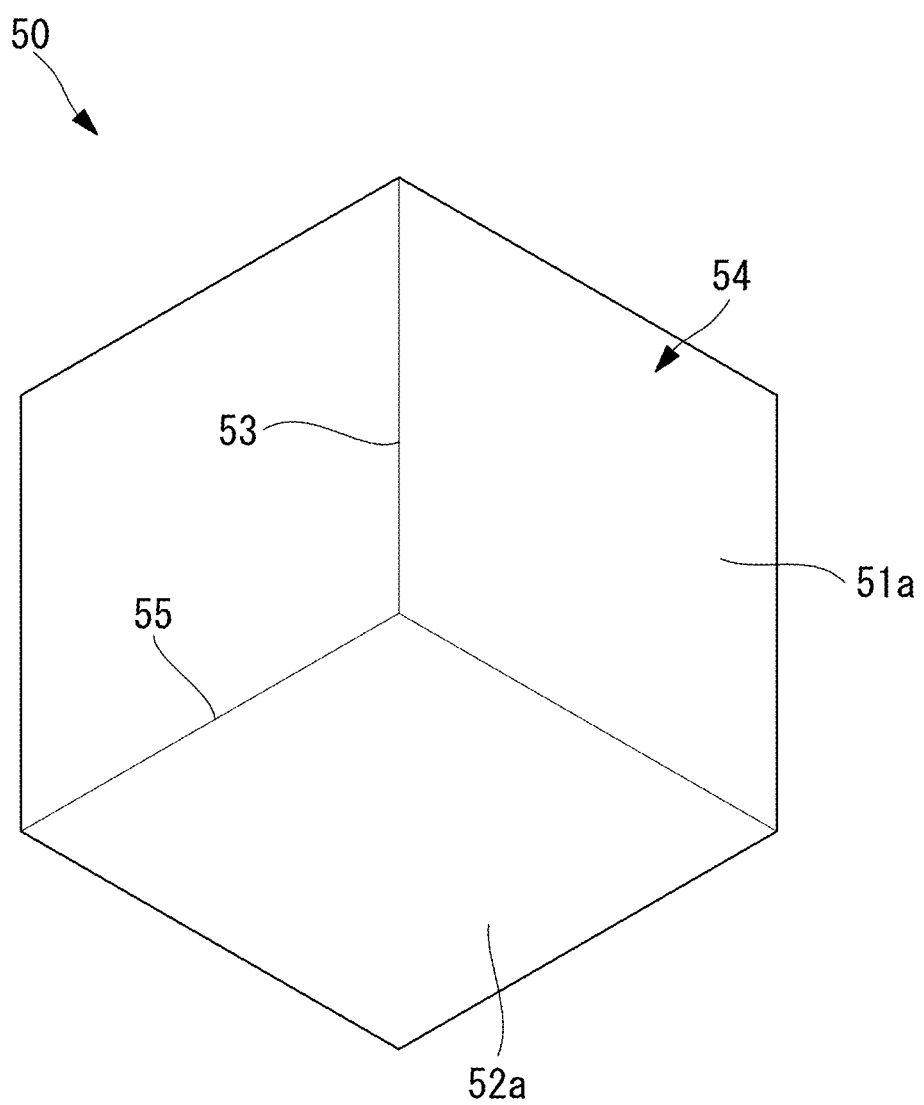
FIG. 9 FIG. 9 is a perspective view showing another modification of the positioning jig in FIG. 4.
Figure 10:
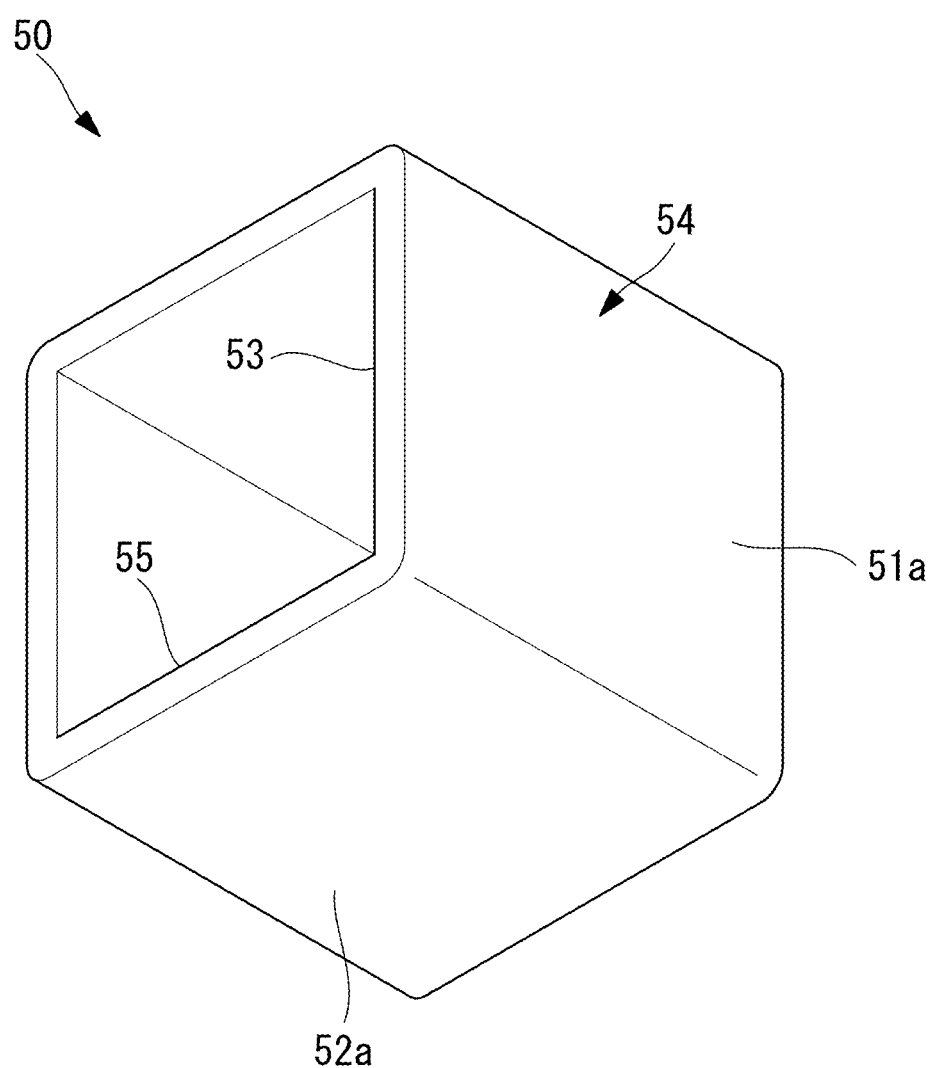
FIG. 10 FIG. 10 is a perspective view showing another modification of the positioning jig in FIG. 4.

In addition, so long as the marking indicator part includes a second edge 55 similar to that described above, the positioning jig may take an arbitrary form, such as a triangular prism block shape shown in FIG. 8, a cuboid block shape shown in FIG. 9, or a square tubular shape shown in FIG. 10.

Figure 11:
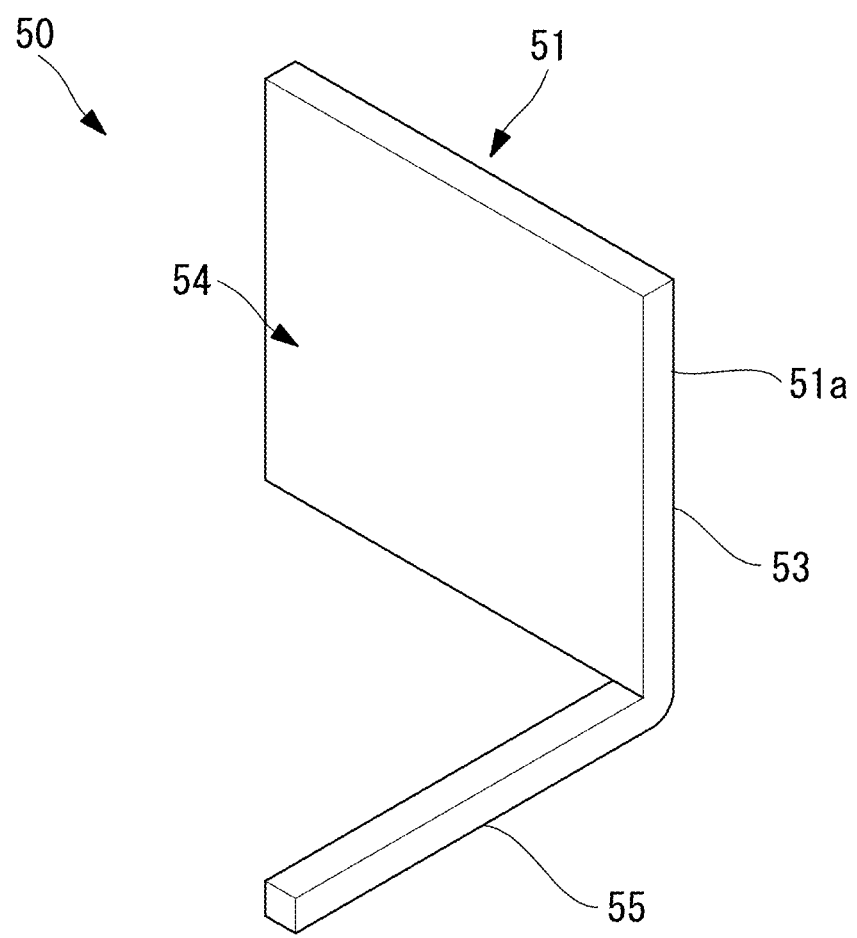
FIG. 11 FIG. 11 is a perspective view showing another modification of the positioning jig in FIG. 4.

In addition, for example, as shown in FIG. 11, the other flat plate part 52 connected to the base part 54 may be provided with a rod-like portion having the second edge 55 instead of the pressing surface 52a.

Figure 12:
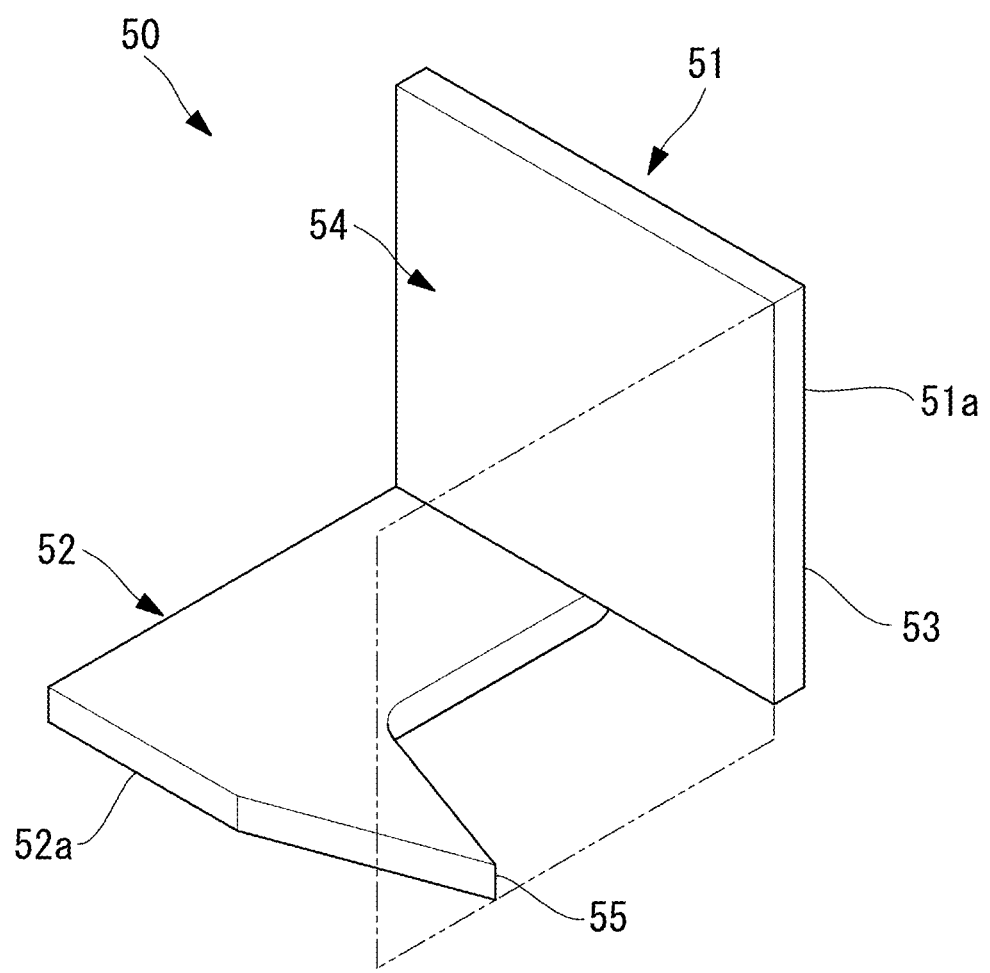
FIG. 12 FIG. 12 is a perspective view showing another modification of the positioning jig in FIG. 4.

In addition, as the marking indicator part 55, an arrow-like form pointing to one point in a plane orthogonal to the pressing surface 51a and including the first edge 53 may be employed, as shown in FIG. 12.

Figure 13:
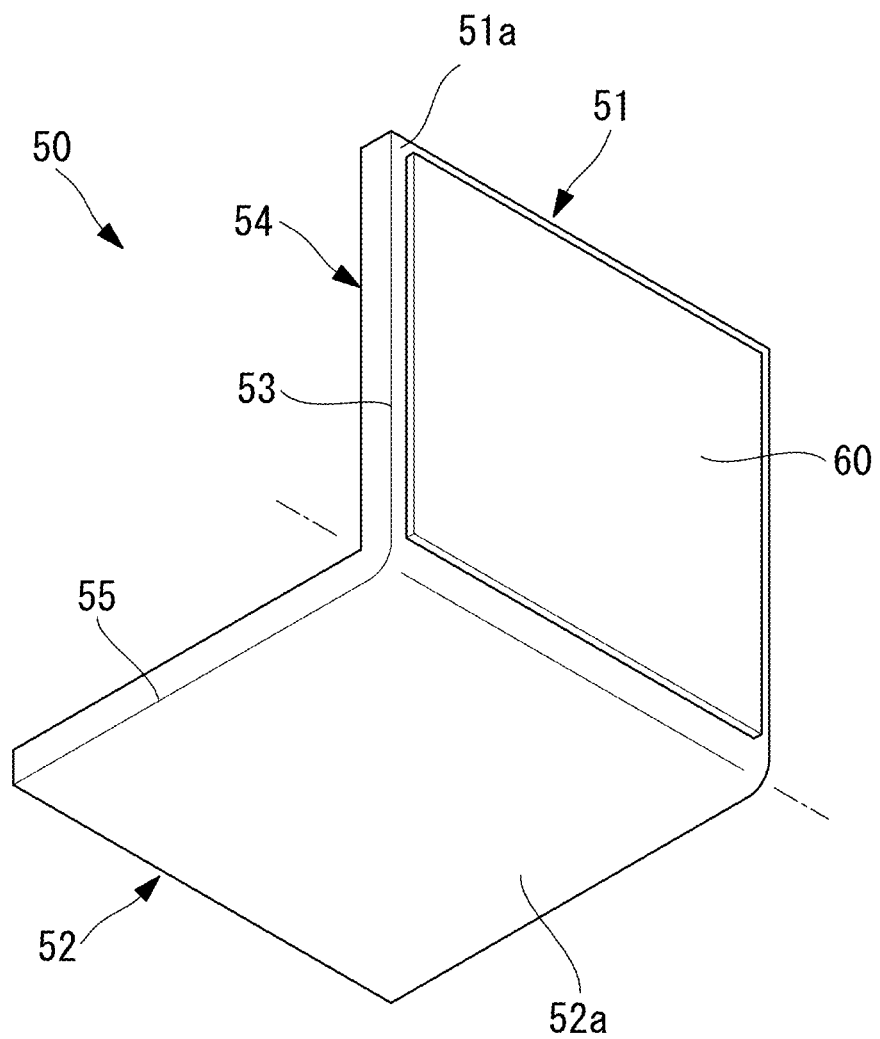
FIG. 13 FIG. 13 is a perspective view showing another modification of the positioning jig in FIG. 4.

In addition, as shown in FIG. 13, a positioning jig 50 in which a plate magnet (magnet) 60 is attached to the pressing surface 51a may be employed. In this case, the plate magnet 60 may be attached to one pressing surface 51a or may be attached to two pressing surfaces 51a, 52a. In a case in which at least one of the positioning bearing surfaces 10, 20 is composed of a magnetic material such as iron, the pressing surfaces 51a, 52a can be held in close contact with the bearing surface parts 11, 21 by means of the magnetic force of the plate magnet 60. With this configuration, a worker does not need to hold the positioning jig 50 with one hand, which further improves the usability thereof.

The magnet may be the plate magnet 60 and may be provided on a surface of one flat plate part 51a on the opposite side from the pressing surface 51a. In addition, the magnet may be embedded inside the one flat plate part 51 so as not to protrude from the pressing surface 51a.

In addition, the plate magnet 60 may be attached to the pressing surface 51a in a detachable manner. As a method for attaching the plate magnet 60 to the pressing surface 51a in a detachable manner, the positioning jig 50 may be formed of a magnetic material, or the pressing surface 51a may be provided with an adhesive sheet that allows peeling of the plate magnet 60. As the adhesive sheet, for example, a double-sided tape, an adhesive with low adhesive strength, or the like may be employed.

In addition, a positioning jig 50 in which the pressing surface 51a is provided with an adhesive sheet releasably bonded to the positioning bearing surfaces 10, 20 may be employed.

With this configuration, even in a case in which the positioning bearing surfaces 10, 20 are formed of a non-magnetic material, the pressing surfaces 51a, 52a can be held in close contact with the bearing surface parts 11, 21 by means of a bonding force or adhesive force.

In addition, although a case in which the V-shaped grooves 12, 22 in the positioning bearing surfaces 10, 20 are provided as the markings has been described in this embodiment, the markings are not limited thereto, and may be simple scribe lines, or straight line-drawn seals may be attached to the bearing surface parts 11, 21.

In addition, although positioning between the first arm 4 and the second arm 5 has been illustrated as an example, alternatively, the positioning jig may be similarly applied to positioning between other two members 2, 3, 4, 5, 7, 8, 9.

Figure 14:
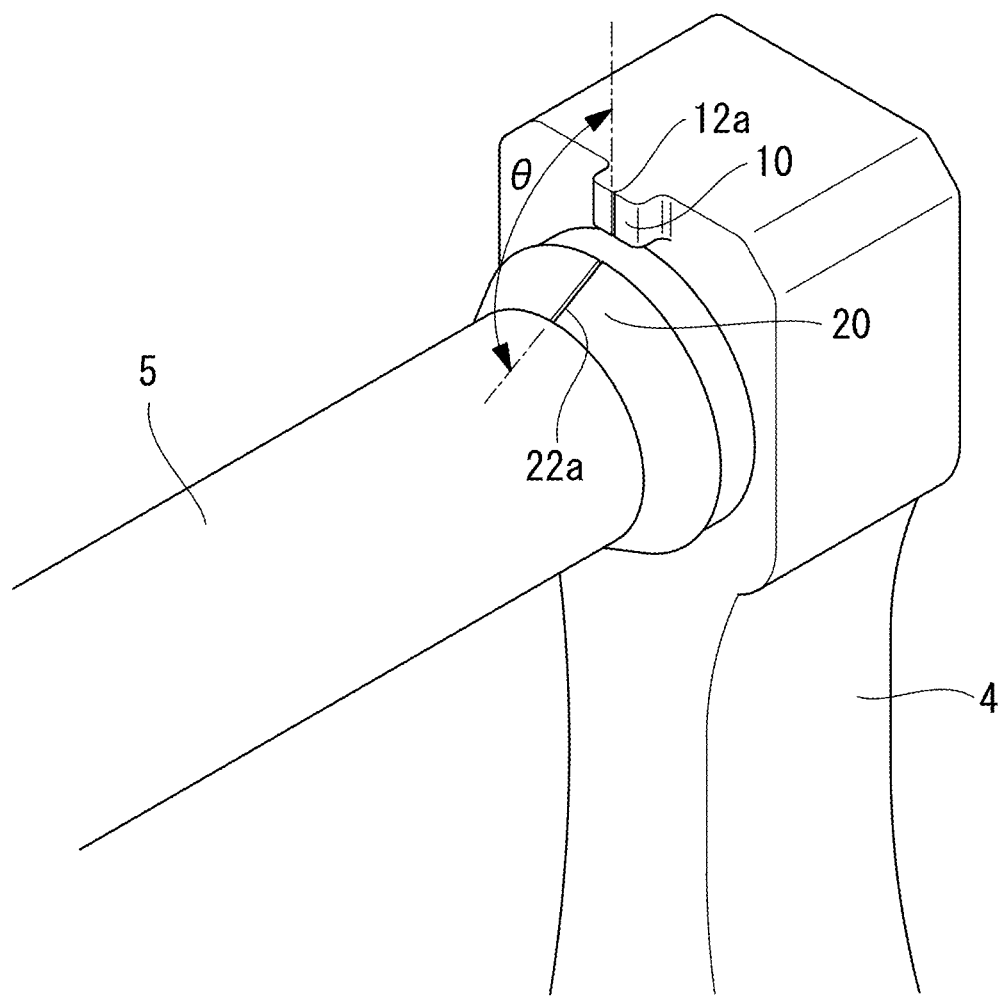
FIG. 14 FIG. 14 is a perspective view showing a modification of the third rotary joint constituted of the first arm and the second arm of the robot in FIG. 1.

In addition, although the positioning jig using a member formed in an L-shape by being bent by 90° has been illustrated as an example of the positioning jig 50 according to this embodiment, the positioning jig is not limited thereto. In the robot 1, as shown in FIG. 14, in a case in which the groove bottom 12a of the V-shaped groove 12 extends in a direction intersecting the relative movement direction of the second arm 5 with respect to the first arm 4, or in a case in which the groove bottom 22a of the V-shaped groove 22 extends in a direction orthogonal to the relative movement direction of the second arm 5, the positioning bearing surface 10 of the first arm 4 and the positioning bearing surface 20 of the first arm 5 are provided so as to form a prescribed angle $\theta$ ($0°<\theta<180°$).

Figure 15:
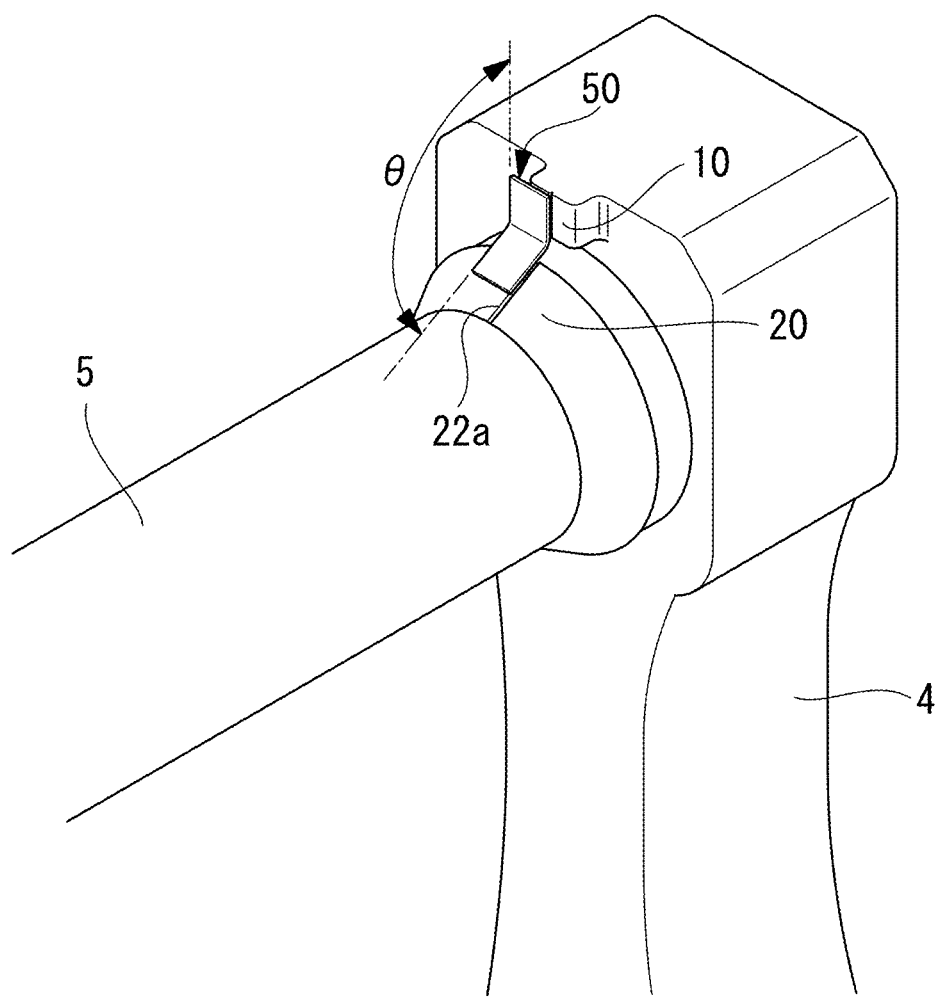
FIG. 15 FIG. 15 is a perspective view showing a state in which the first edge of the positioning jig is aligned with the V-shaped groove in the positioning bearing surface of the second arm, and the V-shaped groove in the positioning bearing surface of the first arm is aligned with the second edge in the robot in FIG. 14.

In this case, as shown in FIG. 15, a positioning jig 50 formed by bending a member according to a prescribed angle $\theta$ between the two positioning bearing surfaces 10, 20 is employed.

In addition, although the six-axis articulated robot has been illustrated as an example of the robot 1 to which the positioning jig is applied, the robot is not limited thereto, and the positioning jig may be applied to robots of any other type and axial configuration. In addition, the positioning jig may be applied not only to a robot having rotary joints but also to a robot having a linear motion mechanism.

The invention claimed is:

1. A positioning system comprising:
   a respective machined flat surface provided in each of two members that constitute a joint and that are moved relative to each other in a tangential direction of a circle centered on an axis of the joint, each machined flat surface extending parallel to the tangential direction;

a respective linear marking placed in each of the machined flat surfaces and extending in a direction orthogonal to the tangential direction; and a positioning jig, wherein the positioning jig includes:

a base part that includes a flat pressing surface pressed against a first machined flat surface which is the machined flat surface provided in one of the two members and a linear first edge extending along either the flat pressing surface or a plane parallel to the flat pressing surface; and a marking indicator part that extends within a plane containing the first edge and is orthogonal to the flat pressing surface, and wherein, when the first edge is brought into alignment along the linear marking placed in the first machined flat surface while the two linear markings are placed in the same plane, the marking indicator part is placed at a position that is aligned with at least a portion of the linear marking placed in a second machined flat surface which is the machined flat surface provided in the other of the two members.

2. The positioning system according to claim 1, wherein the marking indicator part is a linear second edge that extends along a supporting flat surface placeable along the second machined flat surface, when the flat pressing surface is pressed against the first machined flat surface.

3. The positioning system according to claim 2, wherein the flat pressing surface and the supporting flat surface are arranged so as to be orthogonal to each other.

4. The positioning system according to claim 1, wherein the positioning jig has an L-shaped form in which a strip-like flat plate having a constant width is bent at a right angle.

5. The positioning system according to claim 1, wherein at least the flat pressing surface is provided with a magnet maintaining the flat pressing surface in a state of being pressed against the first machined flat surface by means of a magnetic force.

6. The positioning system according to claim 1, wherein at least the pressing surface is provided with an adhesive sheet that releasably bonds the pressing surface to the first machined flat surface.

\* \* \* \* \*